(12) United States Patent
Lai et al.

(10) Patent No.: US 8,067,843 B2
(45) Date of Patent: Nov. 29, 2011

(54) WIRELESS MOUSE WITH POWER GENERATING FUNCTION

(75) Inventors: Yen-Hao Lai, Taipei Hsien (TW);
Chen-Ter Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 422 days.

(21) Appl. No.: 12/485,943

(22) Filed: Jun. 17, 2009

(65) Prior Publication Data

US 2010/0253092 A1    Oct. 7, 2010

(30) Foreign Application Priority Data

Apr. 3, 2009 (CN) ............. 2009 1 0301359

(51) Int. Cl.
*F02B 63/04* (2006.01)
*F03G 7/08* (2006.01)
*H02K 7/18* (2006.01)
*H02J 7/00* (2006.01)
*G06F 3/033* (2006.01)
*G09G 5/08* (2006.01)

(52) U.S. Cl. .............. 290/1 R; 320/114; 345/163
(58) Field of Classification Search ........... 290/1 R; 320/114; 345/163
See application file for complete search history.

(56) References Cited

U.S. PATENT DOCUMENTS

| | | | | |
|---|---|---|---|---|
| 5,838,138 A * | 11/1998 | Henty | | 320/107 |
| 6,617,825 B2 * | 9/2003 | Chu | | 320/114 |
| 6,686,903 B1 * | 2/2004 | Peng | | 345/163 |
| 6,903,725 B2 * | 6/2005 | Nacson | | 345/163 |
| 7,554,212 B2 * | 6/2009 | Nishimura et al. | | 290/1 E |
| 7,583,254 B2 * | 9/2009 | Yatsu | | 345/163 |
| 7,615,900 B1 * | 11/2009 | Harris | | 310/81 |
| 2003/0048092 A1 * | 3/2003 | Chu | | 320/107 |
| 2003/0095101 A1 * | 5/2003 | Jou | | 345/163 |
| 2004/0119693 A1 * | 6/2004 | Kaemmler | | 345/163 |
| 2009/0184925 A1 * | 7/2009 | Chien | | 345/163 |
| 2010/0020014 A1 * | 1/2010 | Lin | | 345/163 |
| 2010/0060234 A1 * | 3/2010 | Nacson | | 320/114 |

\* cited by examiner

*Primary Examiner* — Pedro J Cuevas
(74) *Attorney, Agent, or Firm* — Altis Law Group, Inc.

(57) ABSTRACT

A wireless mouse includes a magnetic ball, a power generating device and a power storage device. The power generating device includes an inductive coil, being dome-shaped and partially covering the magnetic ball and configured for generating inductive voltage following the movement of the magnetic ball, and a converting unit, being configured for converting the inductive voltage to a stabilized DC voltage. The power storage device electrically is coupled to the power generating device and configured for being charged by the converting unit using the stabilized DC voltage and provide power for the wireless mouse.

13 Claims, 4 Drawing Sheets

WIRELESS MOUSE WITH POWER GENERATING FUNCTION

BACKGROUND

1. Technical Field

The present disclosure relates to wireless mice, and particularly to a wireless mouse with a power generating function.

2. Description of Related Art

A mouse may be wired or wirelessly connected to a host such as a personal computer. In the case of the wired mouse, the mouse is powered by the host via the cable. However, because the mouse is tethered to the host by the cable, the range of movement of the mouse is limited. In the case of a wireless mouse, a battery is used to power the wireless mouse. However, frequent replacement of the battery is an inconvenient and also may be expensive for users. Moreover, if the battery is disposable, then disposing of the battery may not be environmentally friendly.

Therefore, what is needed is to provide a mouse, in which the above problems are eliminated or at least alleviated.

DETAILED DESCRIPTION

Figure 1:
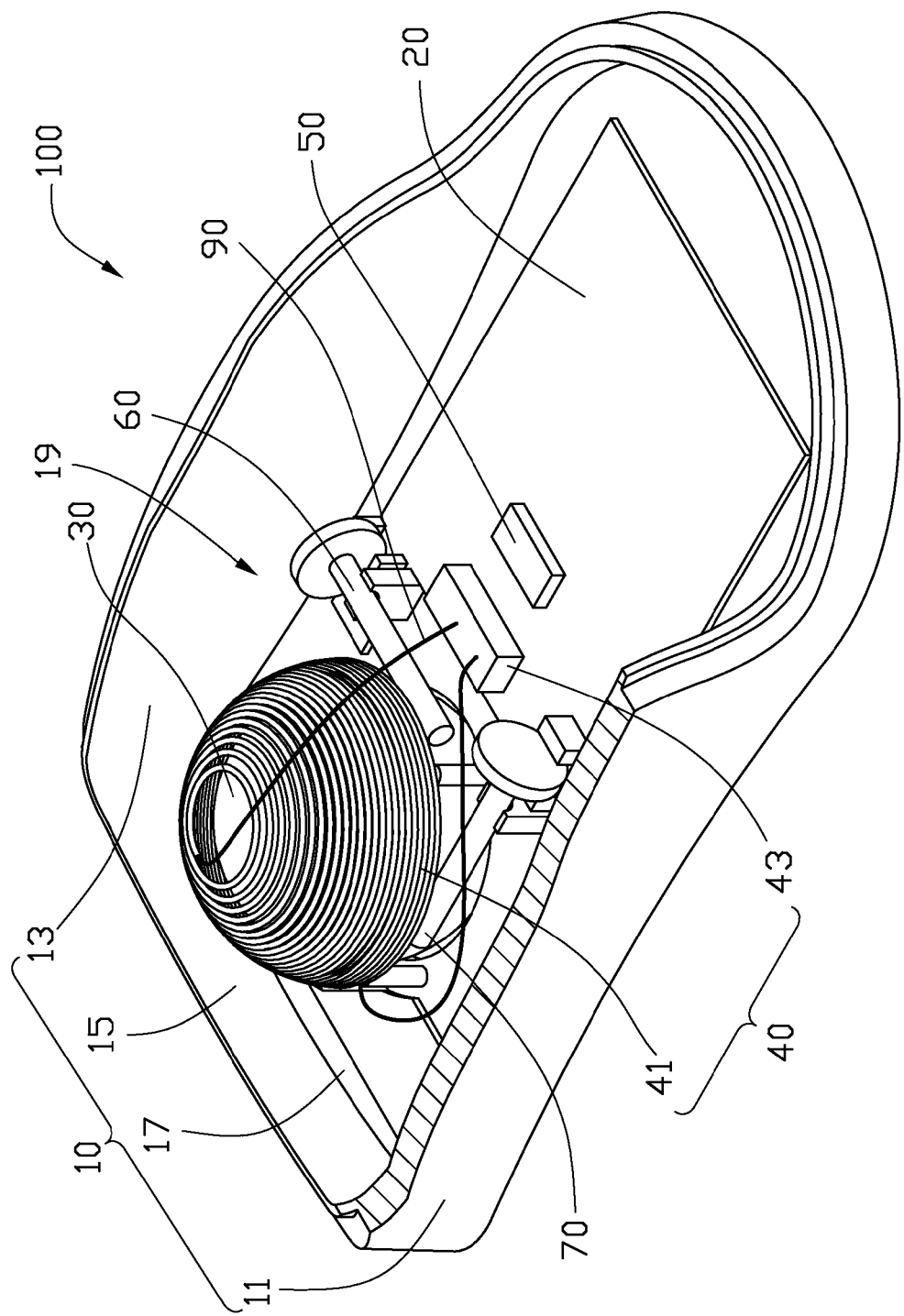
FIG. 1 is a partially schematic isometric view of a wireless mouse including a power generating device, according to an exemplary embodiment.
Figure 2:
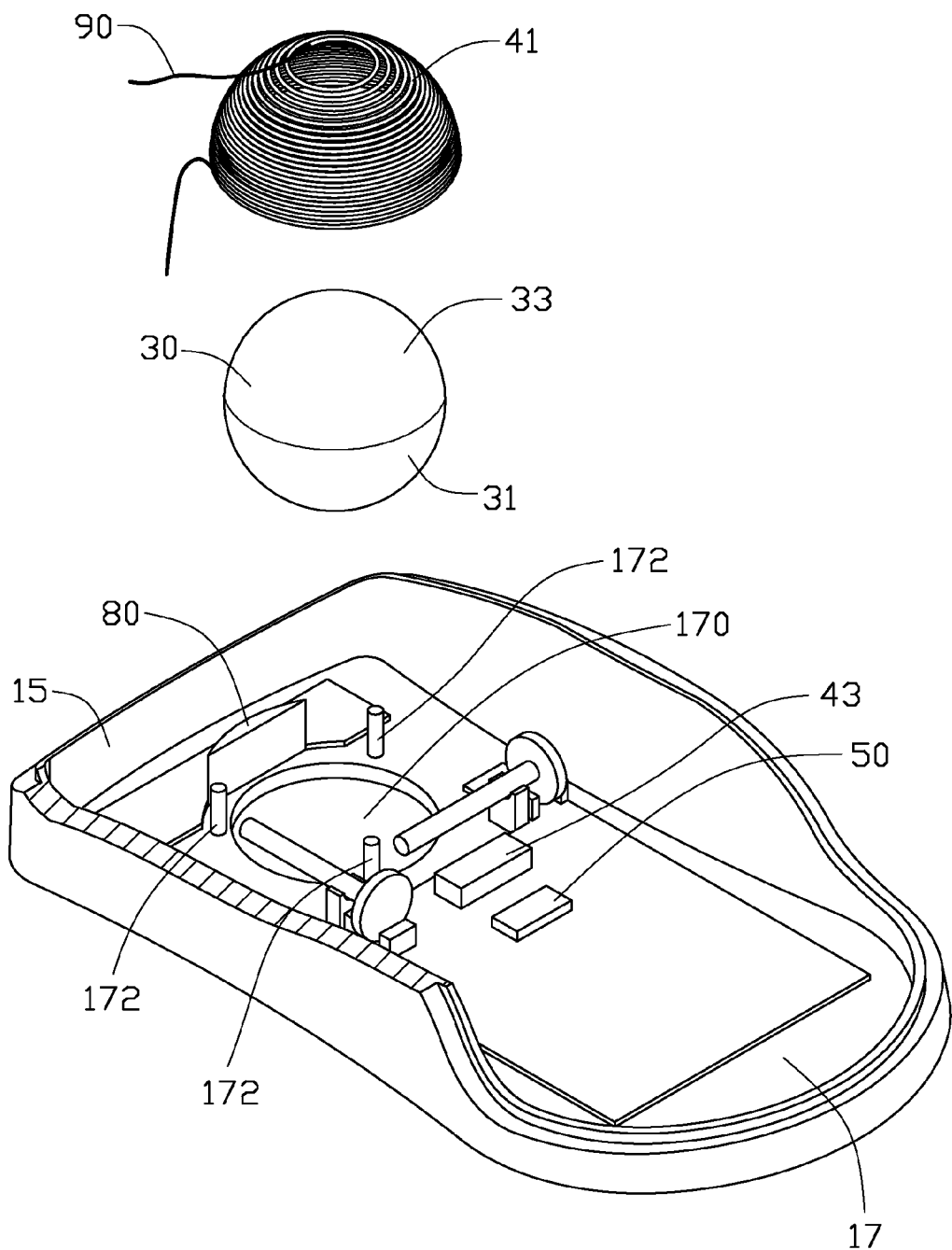
FIG. 2 is a partially exploded view of the wireless mouse of FIG. 1.

Referring to FIG. 1 and FIG. 2, a wireless mouse 100, according to an exemplary embodiment, includes a housing 10, a circuit board 20, a magnetic ball 30, a power generating device 40, a power storage device 50, a first sensing unit 60, a second sensing unit 70, a blocking portion 80 and conductive wires 90.

The housing 10 includes a first side wall 11, a second side wall 13 opposite to the first side wall 11, a third side wall 15 and a bottom board 17. The third side wall 15 connects the first side wall 11 to the second side wall 13. The bottom board 17 perpendicularly connects to the first side wall 11, the second side wall 13 and the third side wall 15. A receiving space 19 is defined by the first side wall 11, the second side wall 13, the third side wall 15 and the bottom board 17 cooperatively. The receiving space 19 is configured for receiving the circuit board 20, the magnetic ball 30, the power generating device 40, the power storage device 50, the first sensing unit 60, the second sensing unit 70, the blocking portion 80 and numerous conductive wires 90. A through hole 170 is defined running through the bottom board 17. Three insulating fixing rods 172 extend from the bottom board 17 and are positioned around the through hole 170 in the receiving space 19. Understandably, in other embodiment, the three fixing rods 172 are fixed on the bottom board 17 by way of interference fitting and the number of the fixing rods 172 can be more than three.

The circuit board 20 is mounted on the bottom board 17 of the housing 10. In the present embodiment, the circuit board 20 is a printed circuit board.

The magnetic ball 30 includes a positive polarity 31 and a negative polarity 33. The magnetic ball 30 is rotatably and partially received in the through hole 170.

The power generating device 40 is configured for generating a voltage following the movement of the magnetic ball 30 and charging the power storage device 50 using the voltage. The power generating device 40 includes an inductive coil 41 and a converting unit 43.

The inductive coil 41 is supported by the three fixing rods 172. The inductive coil 41 is dome-shaped and partially covers the magnetic ball 30. The inductive coil 41 may be made of copper. Movement of the magnetic ball 30 induces a varying voltage in the inductive coil 41. Inductive voltage is generated in the inductive coil 41 by cutting the magnetic lines of the magnetic field of the magnetic ball 30 when the magnetic ball 30 rolls.

Figure 3:
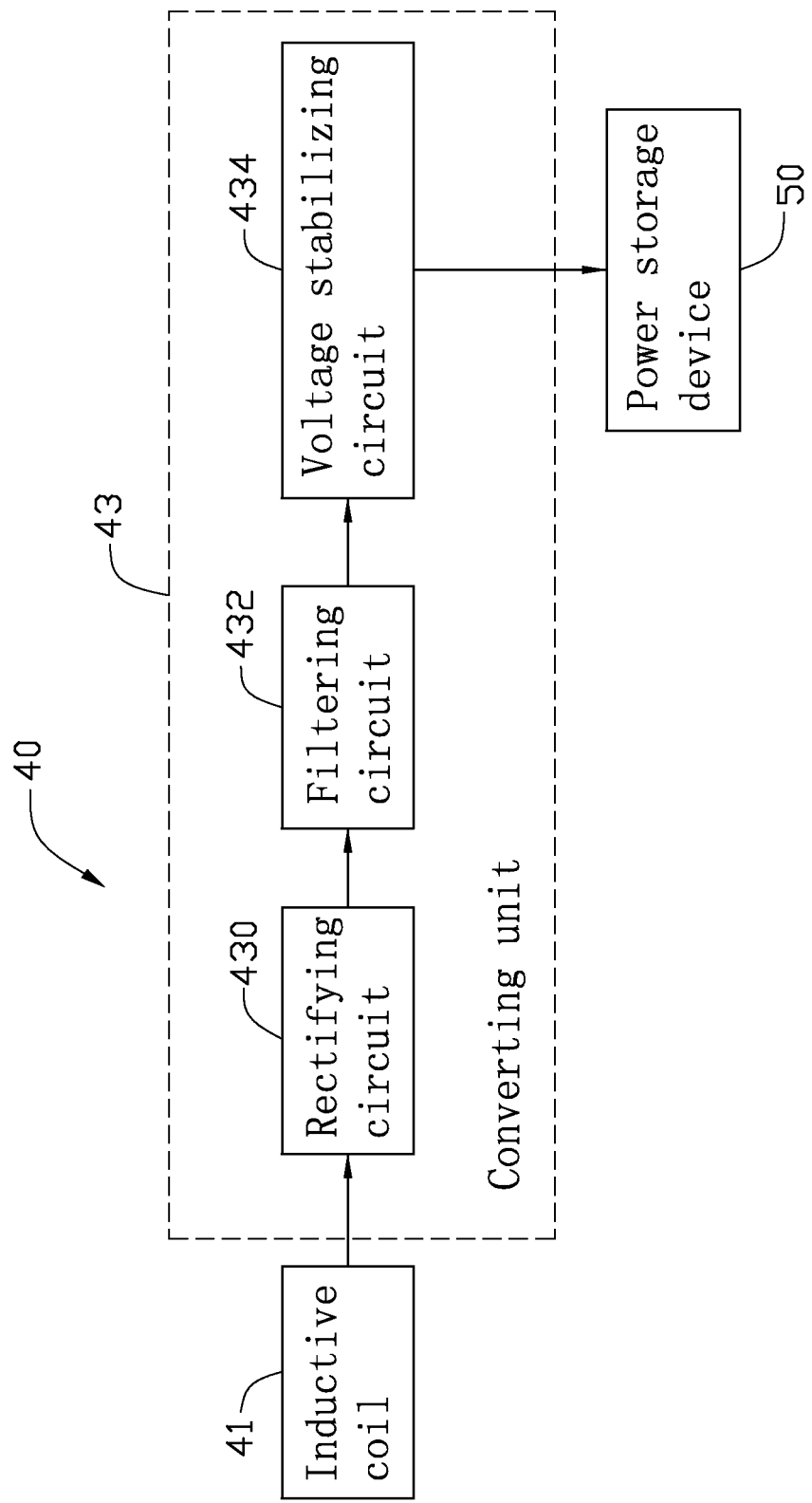
FIG. 3 is a functional block diagram of the power generating device of the wireless mouse of FIG. 1.

Further referring to FIG. 3, the converting unit 43 is configured for converting the varying induced voltage into a stabilized DC voltage and charging the power storage device 50 using the stabilized direct-current DC voltage. The converting unit 43 is electrically mounted on the circuit board 20 and electrically coupled to the inductive coil 41 using the conductive wires 90. The converting unit 43 includes a rectifying circuit 430, a filtering circuit 432 and a voltage stabilizing circuit 434. The rectifying circuit 430 is configured for rectifying the varying inductive or AC voltage into a DC voltage. Because kinetic energy of the magnetic ball 30 is unstable, the DC voltage contains many impulses. The filtering circuit 432 is configured for filtering impulses of the DC voltage. The voltage stabilizing circuit 434 is configured for stabilizing the filtered DC voltage and charging the power storage device 50 using the stabilized DC voltage.

The power storage device 50 is configured for storing the stabilized DC voltage and supplying electrical power for the wireless mouse 100. The power storage device 50 is electrically mounted on the circuit board 20 and electrically coupled to the converting unit 43 via the circuit board 20. The power storage device 50 may be a rechargeable power storage device and include rechargeable nickel metal hydride battery or a Li-ion battery. When a rechargeable nickel metal hydride battery is employed, a volume of the wireless mouse 100 is reduced.

The first sensing unit 60 is configured for sensing a displacement of the magnetic ball 30 along an X-axis. The second sensing unit 70 is configured for sensing a displacement of the magnetic ball 30 along a Y-axis which is orthogonal to the X-axis. The wireless mouse 100 detects movement of the magnetic ball 30 by using the first sensing unit 60 and the second sensing unit 70 and controls movement of a cursor on a display of a computer (not shown), according to the sensing result of the first sensing unit 60 and the second sensing unit 70. The first sensing unit 60, the second sensing unit 70, and the blocking portion 80 cooperatively keep the magnetic ball 30 staying in the through hole 170.

When the mouse 100 is in use, the magnetic ball 30 is rolled. Therefore, the power storage device 50 is charged by the power generating device 40 using an induced voltage following the movement of the magnetic ball 30. Frequent replacement of the power storage device 50 can be avoided, and a longtime use of the power storage device 50 is achieved, which is environmentally friendly.

Figure 4:
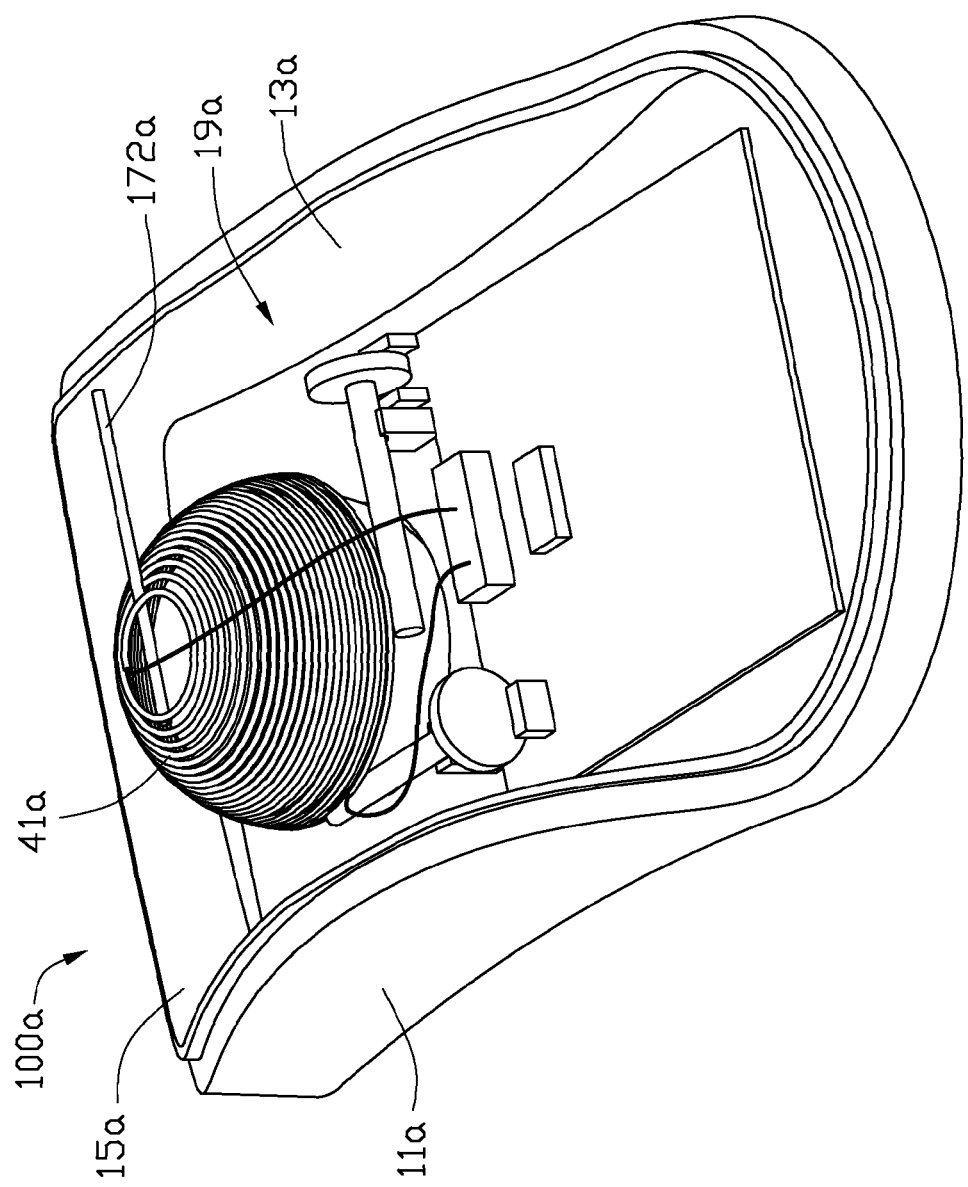
FIG. 4 is a partially schematic isometric view of a wireless mouse according to another exemplary embodiment.

Referring to FIG. 4 together with FIG. 1, a wireless mouse 100a, according to another exemplary embodiment is shown. Difference between the wireless mouse 100a and the wireless mouse 100 is that an insulating fixing rod 172a is used instead of the three fixing rods 172.

The fixing rod 172a extends from the second side wall 13a into the receiving space 19a. The fixing rod 172a passes through an upper portion of the inductive coil 41a and fixes to the inductive coil 41a using an adhesive.

Understandably, in other embodiment, the fixing rod 172a can extend from the first side wall 11a or the third side wall 15a; the fixing rod 172a also can be fixed on one of the first side wall 11a, the second side 13a or the third side wall 15a by way of interference fitting. Advantages of the wireless mouse 100a are similar to those of the wireless mouse 100.

It is to be understood, however, that even though numerous has been described with reference to particular embodiments, but the present invention is not limited to the particular embodiments described and exemplified, and the embodiments are capable of considerable variation and modification without departure from the scope of the appended claims.

What is claimed is:

1. A wireless mouse, comprising:
    a magnetic ball;
    a power generating device comprising an inductive coil and a converting unit, the inductive coil being dome-shaped and partially covering the magnetic ball and configured for generating an inductive voltage following the movement of the magnetic ball, the converting unit being configured for converting the inductive voltage to a stabilized DC voltage;
    a power storage device electrically coupled to the power generating device and configured for being charged by the converting unit using the stabilized DC voltage and providing power for the wireless mouse.

2. The wireless mouse of claim 1, further comprising a housing comprising a first side wall, a second side wall opposite to the first side wall, a third side wall perpendicular connecting with the first side wall and the second side wall, a bottom board perpendicular connecting with the first side wall, the second side wall and the third side wall, and a receiving space to receive the wireless mouse defined by the first side wall, the second side wall, the third side wall and the bottom board cooperatively.

3. The wireless mouse of claim 2, further comprising three insulating fixing rods to support the inductive coil partially covering the magnetic ball.

4. The wireless mouse of claim 3, wherein one end of each fixing rods extends from the bottom board and the other end of each fixing rods is fixed on the inductive coil.

5. The wireless mouse of claim 3, wherein one end of each fixing rod is mounted on the bottom board by way of interference fitting and the other end of each fixing rods is fixed on the inductive coil.

6. The wireless mouse of claim 2, further comprising a fixing rod to support the inductive coil partially covering the magnetic ball.

7. The wireless mouse of claim 6, wherein the fix rod extends from one of the first side wall, the second side wall and the third side wall, and the other end of the fixing rod passes through an upper portion of the inductive coil and fixes to the inductive coil using an adhesive.

8. The wireless mouse of claim 6, wherein one end of the fixing rod is fixed on one of the first side wall, the second side wall and the third side wall by way of interference fitting, and the other end of the fixing rod passes through an upper portion of the inductive coil and fixes to the inductive coil using an adhesive.

9. The wireless mouse of claim 1, wherein the power storage device is a rechargeable power storage device.

10. The wireless mouse of claim 9, wherein the power storage device is a rechargeable nickel metal hydride battery.

11. The wireless mouse of claim 9, wherein the power storage device is a Li-ion battery.

12. The wireless mouse of claim 1, wherein the converting unit comprises a rectifying circuit configured for rectifying the inductive voltage for DC voltage containing many impulses, a filtering circuit configured for filtering impulses of the DC voltage and a voltage stabilizing circuit configured for stabilizing voltage of the DC voltage after filtering and charging the power storage device using the stabilized DC voltage.

13. The wireless mouse of claim 1, wherein inductive voltage is generated in the inductive coil when the magnetic ball rolls.

* * * * *